US010777880B2

(12) United States Patent
Teo et al.

(10) Patent No.: US 10,777,880 B2
(45) Date of Patent: Sep. 15, 2020

(54) ADJUSTABLE ANTENNA SYSTEM TO COMMUNICATE WITH AN IMPLANTABLE MEDICAL DEVICE AND METHOD FOR USING SAME

(71) Applicant: St. Jude Medical Luxembourg Holdings II S.a.r.l. ("SJM Lux II), Sylmar, CA (US)

(72) Inventors: Chee Kong Teo, Alpharetta, GA (US); Zachary Rice, Fermandina Beach, FL (US); Quoc Dang, Roseville, MN (US); Nick Donnay, Maple Grove, MN (US); Ryan Albu, Minneapolis, MN (US)

(73) Assignee: ST. JUDE MEDICAL LUXEMBOURG HOLDINGS II S.A.R.L. (#SJM Lux II), Sylmar, CA (US)

( * ) Notice: Subject to any disclaimer, the term of this patent is extended or adjusted under 35 U.S.C. 154(b) by 0 days.

(21) Appl. No.: 16/399,813

(22) Filed: Apr. 30, 2019

(65) Prior Publication Data
US 2019/0341683 A1  Nov. 7, 2019

Related U.S. Application Data

(60) Provisional application No. 62/668,093, filed on May 7, 2018.

(51) Int. Cl.
*H01Q 1/24* (2006.01)
*H01Q 1/42* (2006.01)
(Continued)

(52) U.S. Cl.
CPC ............... *H01Q 1/42* (2013.01); *H01Q 1/24* (2013.01); *H01Q 7/00* (2013.01); *H04B 5/0081* (2013.01); *H04B 1/40* (2013.01)

(58) Field of Classification Search
CPC .. H01Q 1/42; H01Q 1/40; H01Q 1/24; H01Q 7/00; H04B 5/0081
See application file for complete search history.

(56) References Cited

U.S. PATENT DOCUMENTS 7,432,723 B2   10/2008   Ellis et al.
7,973,540 B2   7/2011    Kroh et al.
(Continued)

*Primary Examiner* — Jimmy T Vu
(74) *Attorney, Agent, or Firm* — The Small Patent Law Group LLC; Dean D. Small

(57) ABSTRACT

An antenna system and method is provided for communicating with a medical device implanted in a patient. Upper and lower shells join to form an antenna tunnel there between. At least one of the upper or lower shells includes an opening along an edge thereof to form a passage to the antenna tunnel. The upper shell includes an outer patient engaging surface configured to abut against the patient. An antenna assembly includes a substrate and an inductive RF antenna provided on the substrate. The antenna assembly is movable within the antenna tunnel. The substrate includes a stem projecting through the passage. A handle is joined to the stem and is located outside of the antenna tunnel. The antenna assembly is movable within the antenna tunnel in response to adjustment of the handle relative to the upper and lower shells. An electronics circuit is electrically coupled to the antenna and is configured to transmit and receive inductive RF signals to and from the medical device implanted in a patient.

17 Claims, 7 Drawing Sheets

(51) Int. Cl.
    *H01Q 7/00*         (2006.01)
    *H04B 5/00*         (2006.01)
    *H04B 1/40*         (2015.01)

(56)                 References Cited

U.S. PATENT DOCUMENTS

| | | |
|---|---|---|
| 8,023,729 B2 | 9/2011 | Kroh et al. |
| 8,669,770 B2 | 3/2014 | Cros |
| 9,265,958 B2 * | 2/2016 | Joshi ................ H01Q 21/30 |
| 2010/0149042 A1 * | 6/2010 | Utsi .................. H01Q 1/2241 |
| | | 343/700 MS |

\* cited by examiner

ADJUSTABLE ANTENNA SYSTEM TO COMMUNICATE WITH AN IMPLANTABLE MEDICAL DEVICE AND METHOD FOR USING SAME

BACKGROUND

Embodiments of the present disclosure generally relate to systems for communicating with implantable medical devices and more particularly to an adjustable antenna system.

Today implantable medical devices communication with various types of external devices. One example of an external device is an electronic patient monitor that is coupled by a cable to a handheld wand/antenna that includes one or more antenna. During an office visit, a patient lays on a clinician table and the wand is inserted between the patient and the table. The wand receives RF communication signals from the medical device and the patient monitor determines and displays signal strength of the incoming RF communications signal. The signal strength needs to reach a certain level before the patient monitor can accurately and reliably communication with the medical device. When the signal strength is too low, the clinician repositions the wand relative to the patient's torso or trunk in an attempt to better align the antenna and medical device.

However, with the patient laying directly on the wand, the wand cannot easily be moved. Accordingly, the patient must sit up slightly, arch his/her back, roll onto one side or perform some other maneuver to take his/her weight off of the wand and provide room to adjust the wand relative to the patient torso or trunk. The patient then lays on the wand again and a new signal strength reading is obtained. The foregoing process of measuring signal strength and adjusting the wand position is continuously repeated until a sufficiently high signal strength is obtained to afford accurate and reliable communication between the patient monitor and the implanted medical device.

SUMMARY

In accordance with embodiments herein, an antenna system for communicating with a medical device implanted in a patient is provided. Upper and lower shells join to form an antenna tunnel there between. At least one of the upper or lower shells includes an opening along an edge thereof to form a passage to the antenna tunnel. The upper shell includes an outer patient engaging surface configured to receive a weight of the patient. An antenna assembly includes a substrate and an inductive RF antenna provided on the substrate. The antenna assembly is movable within the antenna tunnel. The substrate includes a stem projecting through the passage. A handle is joined to the stem and is located outside of the antenna tunnel. The antenna assembly is movable within the antenna tunnel in response to adjustment of the handle relative to the upper and lower shells. An electronics circuit is electrically coupled to the antenna and is configured to transmit and receive inductive RF signals to and from the medical device implanted in a patient.

Optionally, the upper and lower shells may maintain a predetermined height within the antenna tunnel while experiencing a load on the upper shell. The upper and lower shells may maintain the predetermined height to resist formation of a binding engagement between the antenna assembly and the antenna tunnel while supporting, as the load, a weight of a patient when arranged in a supine position resting on the outer patient engaging surface. The upper shell may be formed with a concave body that may include a patient comfort taper in the outer patient engaging surface in at least one of longitudinal and lateral directions. The upper shell may include an inner surface having reinforcement ribs thereon to resist bowing while experiencing a load on the outer patient engaging surface. The lower shell may include an inner surface that may be configured to maintain a low friction interface with the substrate of the antenna assembly when the antenna assembly is moved relative to the lower shell. The upper and lower shells may be formed as planar plates and may be spaced apart from one another by peripheral supports to define the antenna tunnel.

Optionally, the antenna may comprise inner and outer traces provided on the substrate. The inner and outer traces may be arranged concentric with one another and may extend in a generally circular direction about a common center point. The electronics circuit may be housed within the handle. The electronics circuit may include a transmitter configured to wirelessly communicate with a monitoring device. The antenna assembly may be configured to be moved within the antenna tunnel in connection with aligning the antenna with the medical device. The lower shell may include an outer mounting surface that may be configured to be positioned on a patient table. The upper shell may include an outer patient engaging surface configured to abut against a patient torso. The inductive RF antenna may be configured to transmit and receive RF signals in a range of 1 to 100 MHz. The inductive RF antenna may include an RF transmitting coil and an RF receiving coil that are arranged concentric with one another.

In accordance with embodiments herein, a method is provided. The method provides an antenna system that comprises upper and lower shells that join to form an antenna tunnel there between. An antenna assembly includes a substrate and an inductive RF antenna provided on the substrate. The antenna assembly includes a handle located outside of the upper and lower shells. The method positions a patient, having an implantable medical device, against the outer shell such that the implantable medical device is located proximate to the antenna system. The method aligns the inductive RF antenna with the implantable medical device by adjusting a position of the handle to move the antenna assembly within the antenna tunnel.

Optionally, the method may comprise adjusting the position of the antenna assembly within the antenna tunnel to adjust signal strength of inductive RF signals received by the RF antenna from the medical device until achieving predetermined signal strength.

The method may determine the signal strength of inductive RF signals received by the RF antenna from the medical device, and may display an indication of the signal strength on a display of a monitoring device, the adjusting the position of the antenna assembly based on the indication of the signal strength displayed. The adjusting the position of the antenna assembly may include sliding the antenna assembly within the antenna tunnel without changing a position of the patient against the outer shell. The method may further comprise transmitting and receiving inductive RF signals in a frequency range of 1-100 MHz between the inductive RF antenna and the medical device.

DETAILED DESCRIPTION

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The methods described herein may employ structures or aspects of various embodiments (e.g., systems and/or methods) discussed herein. In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. It should be noted that, other methods may be used, in accordance with an embodiment herein. Further, wherein indicated, the methods may be fully or partially implemented by one or more processors of one or more devices or systems. While the operations of some methods may be described as performed by the processor(s) of one device, additionally, some or all of such operations may be performed by the processor(s) of another device described herein.

Figure 1:
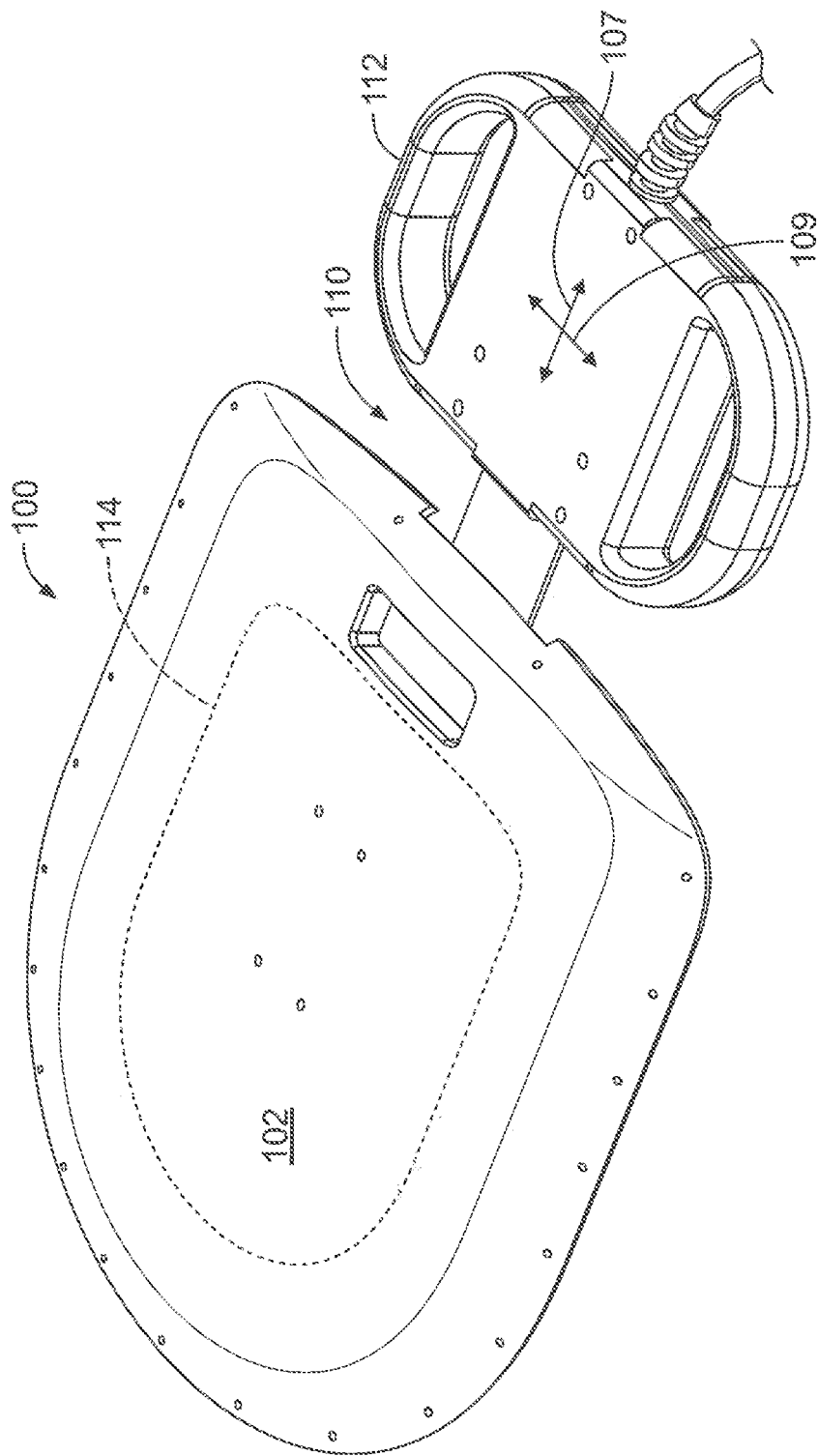
FIG. 1 illustrates an antenna system formed in accordance with embodiments herein.

FIG. 1 illustrates an antenna system 100 formed in accordance with embodiments herein. The antenna system 100 is configured to communicate with a medical device implanted in a patient. For example, the antenna system 100 may communicate with the implanted medical device through inductive RF signals. The implanted medical device may be an active or passive device. When a passive medical device is implanted, the antenna system 100 transmits RF signals to the passive medical device, that are used by the medical device to then transmit RF signals to the antenna system 100.

As explained hereafter, the antenna system 100 includes an upper shell 102 and a lower shell (not visible in FIG. 1) that define an antenna tunnel there between. An antenna assembly 110 includes an antenna 114 (noted in dashed lines) that is movably received within the antenna tunnel. The antenna assembly 110 includes one or more handles 112 located outside of the antenna tunnel. The antenna 114 is movable within the antenna tunnel in response to adjustment of the handle 112 relative to the upper shell 102 in longitudinal and lateral directions 107 and 109.

To initiate a communications session with an implanted medical device in accordance with embodiments herein, the antenna system 100 may be positioned on a patient table and the patient may lie in a supine position upon the table with at least a portion of his/her weight on the antenna system 100. The patient is oriented in a position immediately adjacent and abutting against the antenna system 100 with a portion of the patient's body, where the medical device is implanted, directly aligned with and proximate to the antenna. For example, when a medical device is implanted within the torso or trunk portion of a patient, the patient is adjusted to position a portion of the patient's torso or trunk with the implanted medical device located directly above and upon the antenna system 100.

The antenna system 100 is formed from materials having sufficient structural rigidity to support the portion of the patients weight lying directly on top thereof, while maintaining a desired height or gap within the antenna tunnel. By maintaining the gap, the antenna assembly allows free movement of the antenna 114, while maintaining a low profile for the antenna system 100. The antenna system 100 isolates a patient's weight from the antenna 114 which in turn allows for zero resistance movement of the antenna relative to the patient in connection with aligning the antenna 114 with the medical device.

Figure 2A:
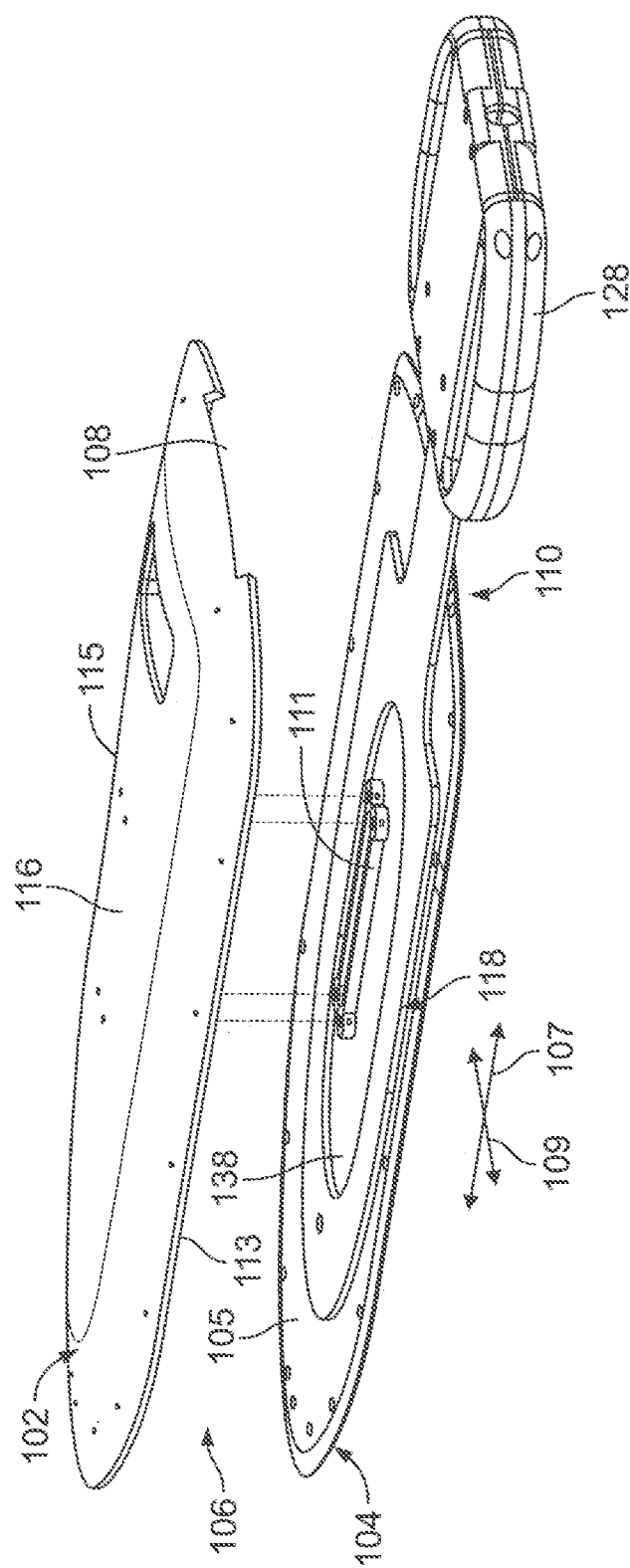
FIG. 2A illustrates an exploded view of the antenna system formed in accordance with embodiments herein.

FIG. 2A illustrates an exploded view of the antenna system 100 formed in accordance with an embodiment herein. The antenna system 100 includes an upper shell 102 and a lower shell 104 that join to form an antenna tunnel 106 there between. At least one of the upper and lower shells 102 and 104 include an opening 108 along an edge thereof to form a passage to the antenna tunnel 106. The upper shell 102 includes an outer patient engaging surface 116 that is configured to abut against and support weight of a patient during a communication session. The lower shell 104 includes an interior antenna support surface 105 that is generally planar and configured to provide a relatively friction-free interface with the antenna assembly 110. The friction-free interface allows the antenna assembly 110 to easy slide relative to the lower shell 104 (and patient) along the longitudinal direction 107 and/or lateral direction 109 until the antenna is positioned at a desired location relative to an implanted medical device. The desired location affords a desired signal strength for the communications session.

In the embodiment of FIG. 2A, the lower shell 104 includes an intermediate support post 111 located generally near a central region of the lower shell 104. The support post 111 extends upward from the antenna support surface 105 and engages an interior surface of the upper shell 102. The support post 111 is formed with a height that defines a predetermined height for the antenna tunnel 106. The support post 111 adds to the structural integrity of the combined upper and lower shells 102, 104 to maintain the predetermined height within the antenna tunnel while experiencing a load on the outer patient engaging surface 116 of the upper shell 102. The structural integrity of the upper and lower shells 102, 104, in combination with the support post 111, maintain the predetermined height to resist formation of a binding engagement between the antenna assembly 110 and the antenna tunnel 106 while supporting, as the load, the weight of at least a portion of the patient when arranged in a supine position resting on the outer patient engaging surface 116.

As described hereafter in more detail, the antenna assembly 110 includes a central opening 138 within which the support post 111 extends through the antenna assembly 110. A range of motion, to which the antenna assembly 110 may be moved in the longitudinal and lateral directions 107, 109, is limited by the size of the central opening 138 which abuts against the support post 111 when reaching limits for the range of motion.

In the embodiment of FIG. 2A, at least the upper shell 102 is formed with a concave body where the outer patient engaging surface 116 is formed with a patient comfort taper extending in at least one of the longitudinal and lateral directions 107, 109. For example, the outer patient engaging surface 116 may be slightly rounded to have a crest along the central longitudinal axis, but recede towards each of the lateral edges 113, 115.

Figure 2B:
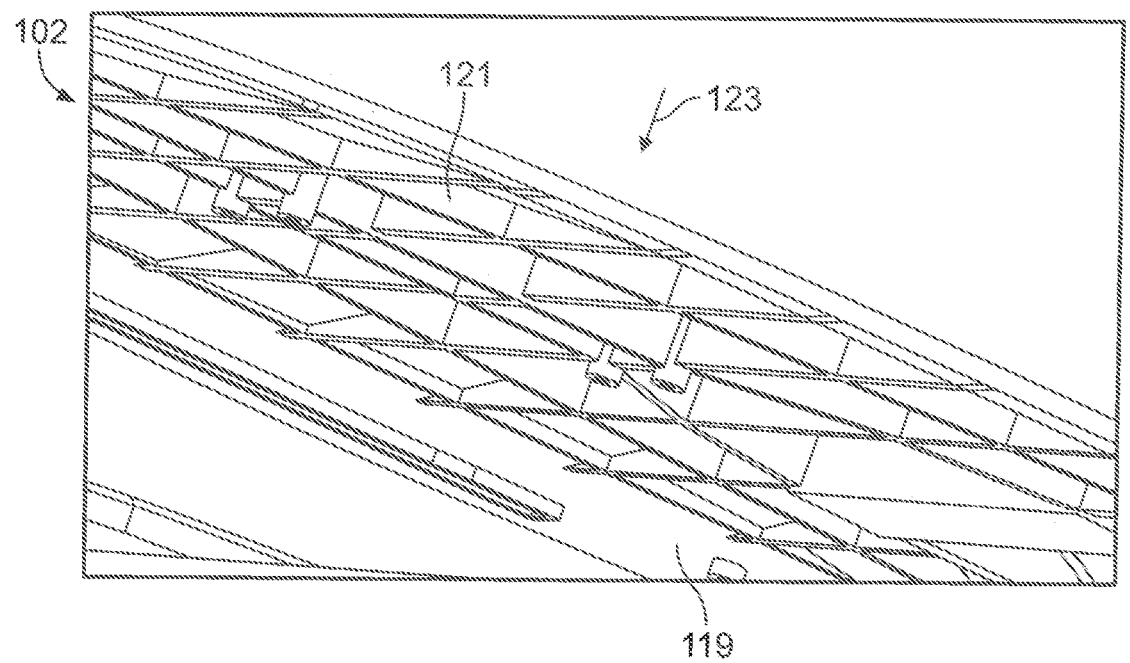
FIG. 2B illustrates a lower perspective view of a portion of the upper shell in accordance with embodiments herein.

FIG. 2B illustrates a lower perspective view of a portion of the upper shell 102. An interior surface 119 of the upper shell 102 may be formed with a plurality of ribs 121 extending in the longitudinal and lateral directions. The ribs 121 are located within the concave region of the upper shell 102 and cooperate to add structural support in order to resist bending when a load force is experienced in the direction of arrow 123.

The upper and lower shells 102, 104 may be formed in alternative manners. By way of example, the upper and lower shells 102, 104 may be formed from plastic through injection molding. One non-limiting example of a material is Acrylonitrile Butadiene Styrene (ABS) blended with Polycarbonate (ABS/PC) which offers a good combination of mechanical and thermal properties. The ABS/PC material offers good impact strength, even in cold temperatures, rigidity, dimensionality, thermal and color stability. Optionally, other materials may be used and other manufacturing processes may be used other than injection molding. Optionally, the upper and lower shells may be formed of a material having a high degree of stiffness and relatively low flexibility, such as carbon fiber, PEEK and the like. When relatively stiff materials are utilized, the upper and lower shells may not utilize an intermediate structural support.

The example of FIGS. 1, 2A and 2B illustrates a generally oval shape for the overall antenna system 100 and antenna assembly 110. Optionally, the antenna system 100 and/or antenna assembly 110 may have other shapes, such as circular, rectangular, square and otherwise.

Figure 3:
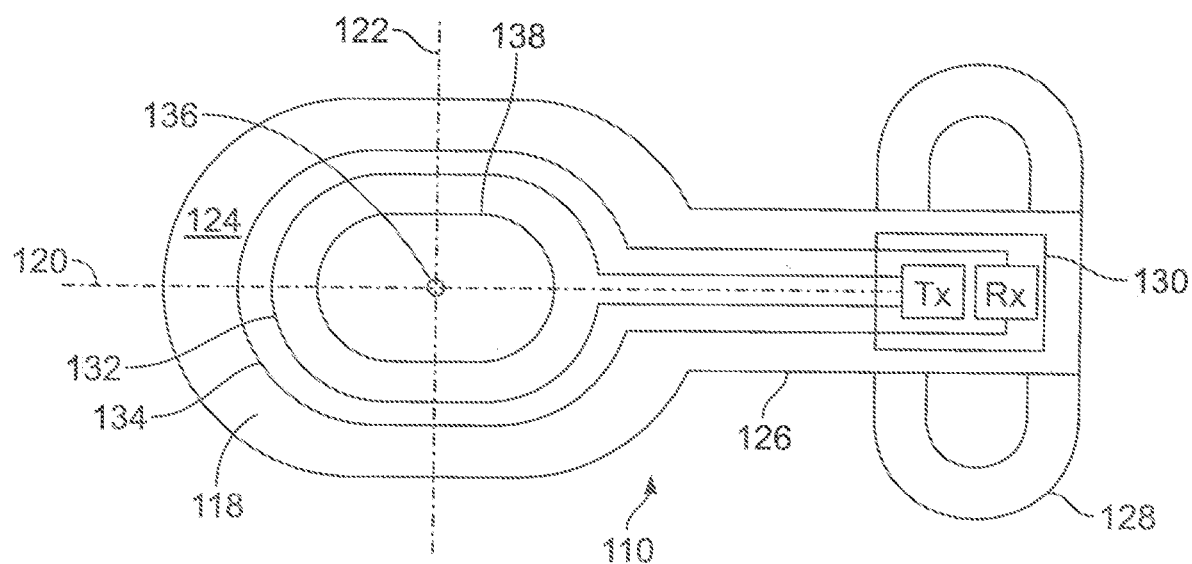
FIG. 3 illustrates a top plan view of the antenna assembly formed in accordance with embodiments herein.

FIG. 3 illustrates a top plan view of the antenna assembly 110 formed in accordance with an embodiment herein. The antenna assembly 110 includes a substrate 118 having an active area 124 shaped in a generally oval manner and extending along a longitudinal axis 120 and along a lateral axis 122. The active area 124 includes the central opening 138, through which the support post 111 (FIG. 2A) extends between the upper and lower shells 102, 104.

A stem 126 extends from an edge of the active area 124. One or more handles 128 are provided on an outer end of the stem 126. The stem 126 is configured to project through the passage defined by the opening 108 in the upper shell 102 (FIG. 2A). The handle 128 remains at a position outside of the antenna tunnel 106 (FIG. 2A). The antenna assembly 110 is movable within the antenna tunnel 106 in response to adjustment of the handle 128 relative to the upper and lower shells 102, 104.

An electronics circuit 130 is provided proximate to the handle 128 on the substrate 118. The electronics circuit 130 includes a transmitter and a receiver that are connected to a corresponding inductive transmit coil 132 and receive coil 134, respectively. The transmit and receive coils 132, 134 collectively define an inductive RF antenna that is provided on the substrate 118. By way of example, the transmit and receive coils 132, 134 may be configured to transmit and receive RF signals in a frequency range of 1 to 100 MHz, and more particularly in a frequency range of 3-50 MHz. The electronics circuit 130 is electrically coupled to the transmit and receive coils 132, 134. The transmitter is configured to transmit inductive RF signals to the medical device implanted in a patient, while the receiver is configured to receive inductive RF signals from the medical device.

The transmit coil 132 is formed as an inner conductive trace provided on the substrate 118, while the receive coil 134 is formed as an outer conductive trace on the substrate 118. Optionally, the positions of the transmit and receive coils 132, 134 may be switched such that the transmit coil 132 represents an outer conductive trace and the receive coil 134 represents an inner conductive trace. The transmit and receive coils 132, 134 are arranged concentric with one another and extend in a generally circular direction about a common central point 136. The term "generally circular" includes true geometric circles, as well as ovals and other curved nonlinear shapes. It is recognized that the transmit and receive coils 132, 134 may be formed to have various shapes and patterns based upon the performance characteristics, transmit and receive frequencies and the like.

Figure 4A:
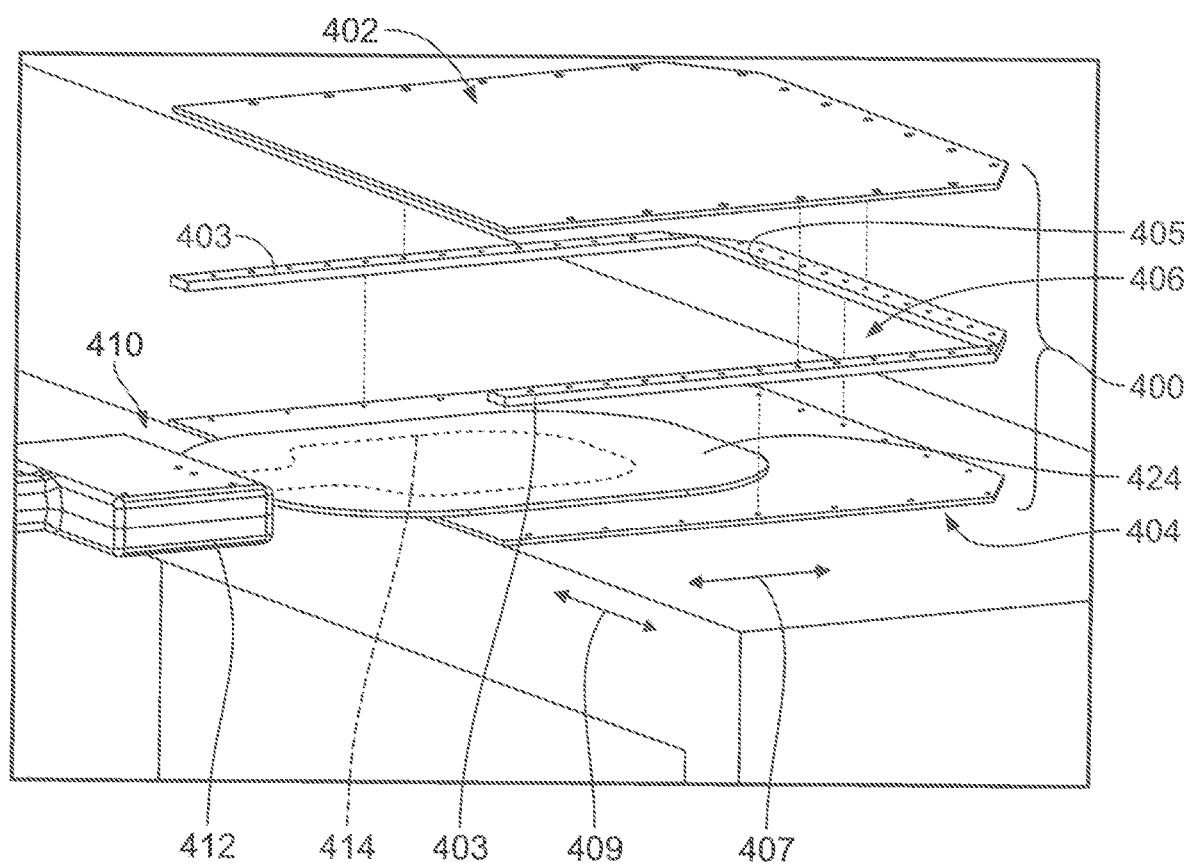
FIG. 4A illustrates an antenna system formed in accordance with an alternative embodiment.
Figure 4B:
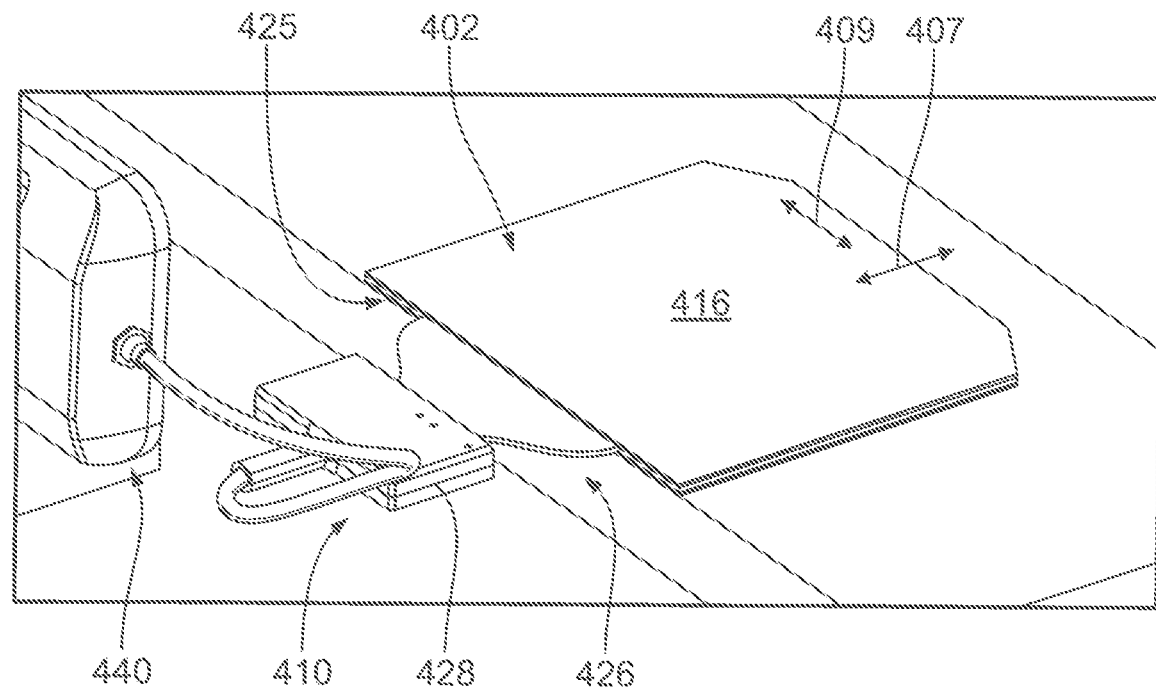
FIG. 4B illustrates an antenna system formed in accordance with an alternative embodiment.
Figure 4C:
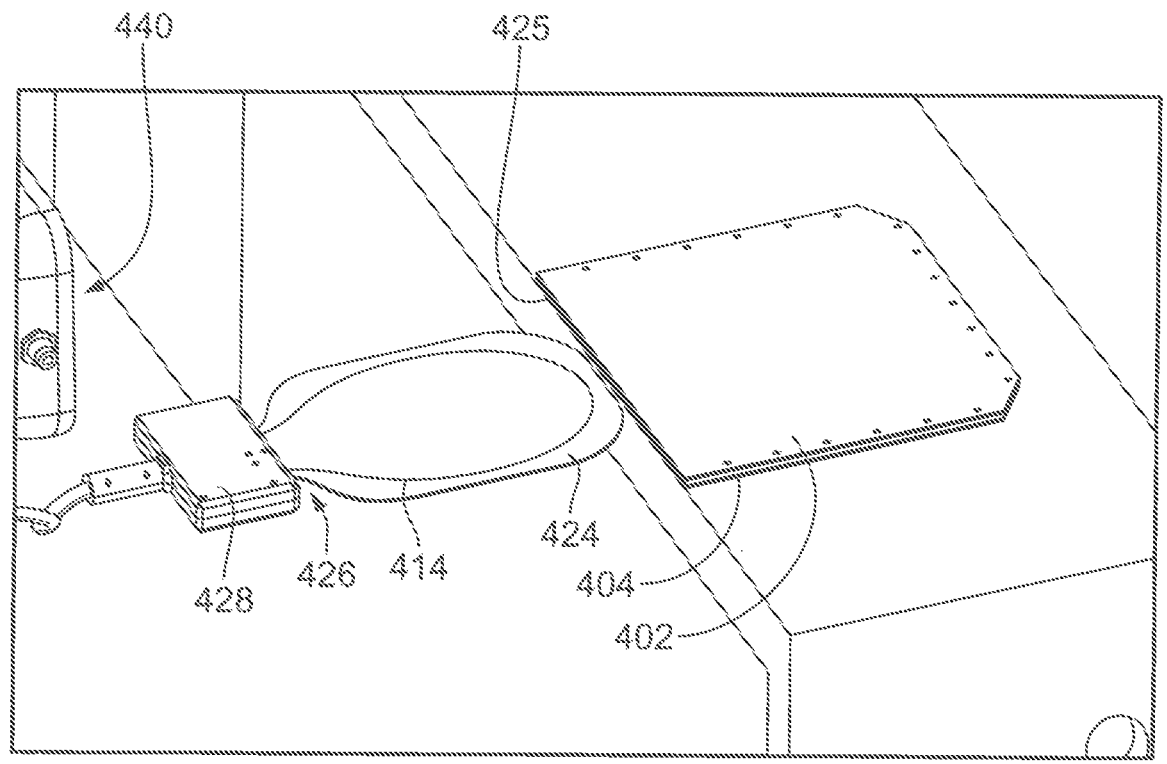
FIG. 4C illustrates an antenna system formed in accordance with an alternative embodiment.

FIGS. 4A-4C illustrates an antenna system 400 formed in accordance with an alternative embodiment. As shown in FIG. 4A, the antenna system 400 includes a planar upper shell 402 and a planar lower shell 404 that are spaced apart by lateral standoffs 403 and an end standoff 405. The lateral and end standoffs 403, 405 separate the upper and lower shells 402, 404 by a predetermined height to form an antenna tunnel 406 there between. An antenna assembly 410 includes an active area 424 that includes one or more antenna 414 (noted in dashed lines) that is movable within the antenna tunnel 406 along the longitudinal and lateral directions 407 and 409.

As shown in FIG. 4B, the upper shell 402 is shaped with a generally flat planar outer patient support surface 416. The antenna 414 is movable within the antenna tunnel 406 in longitudinal and lateral directions 407, 409 in response to adjustment of the handle 412 relative to the upper shell 402. A stem 426 extends from an edge of the active area 424. A base handle 428 is provided on an outer end of the stem 426. The stem 426 is configured to project through a passage 425 defined by the opening along an edge of the upper and lower shells 402, 404. The antenna assembly 410 is movable within the antenna tunnel 406 in response to adjustment of the handle 428 relative to the upper and lower shells 402, 404. The upper and lower shells 402, 404 are formed of a material having a high degree of stiffness and relatively low flexibility, such as carbon fiber, PEEK and the like. When relatively stiff materials are utilized, the upper and lower shells do not utilize an intermediate structural support.

An electronics circuit provided in to the handle 428. The electronics circuit includes a transmitter and a receiver that are connected to a corresponding inductive transmit coil and receive coil, respectively. The transmit and receive coils collectively define an inductive RF antenna that is provided on the substrate. By way of example, the transmit and receive coils may be configured to transmit and receive RF signals in a frequency range of 1 to 100 MHz, and more particularly in a frequency range of 3-50 MHz. The electronics circuit 130 is electrically coupled to the transmit and receive coils. The transmitter is configured to transmit inductive RF signals to the medical device implanted in a patient, while the receiver is configured to receive inductive RF signals from the medical device.

A cable interconnects the antenna assembly 410 to an external patient monitoring device 440. The device 440 includes a display configured to display various information received from the implantable device, including a signal strength of RF signals received by the antenna assembly from the implanted medical device.

In accordance with embodiments herein, a method provides an antenna system as described herein. The method positions a patient, having an implantable medical device, against the outer shell such that the implantable medical device is located proximate to the antenna system. A clinician aligns the inductive RF antenna with the implantable medical device by adjusting a position of the handle to move the antenna assembly within the antenna tunnel. The clinician adjusts the position of the antenna assembly within the antenna tunnel to adjust a signal strength of inductive RF signals received by the RF antenna from the medical device until achieving a predetermined signal strength. The patient monitoring device 440 determines the signal strength of inductive RF signals received by the RF antenna from the medical device, and displays an indication of the signal strength on a display of a monitoring device. The clinician adjusts the position of the antenna assembly based on the indication of the signal strength displayed. The adjusting operation includes sliding the antenna assembly within the antenna tunnel in a generally friction-free movement without a need to change a position of the patient against the outer shell.

Implantable Medical Devices and Antenna Designs

Embodiments herein may utilize one or more of the antenna designs, electronics circuits, and/or implantable devices described one or more of the following patents, all of which are expressly incorporated herein by reference in their entireties:

U.S. Pat. No. 8,896,324 Titled "System and Apparatus for In-Vivo Assessment of Relative Position of an Implant"; U.S. Pat. No. 8,026,729 Titled "System and Apparatus for In-Vivo Assessment of Relative Position of an Implant"; U.S. Pat. No. 8,278,941 Titled "Strain Monitoring System and Apparatus"; U.S. Pat. No. 8,870,787 Titled "Ventricular Shunt System and Method" U.S. Pat. No. 9,041,416 Titled "Physical Property Sensor with Active Electronic Circuit and Wireless Power and Data Transmission"; U.S. Pat. No. 9,653,926 Titled "Physical Property Sensor with Active Electronic Circuit and Wireless"; U.S. Pat. No. 8,264,240 Titled "Physical Property Sensor with Active Electronic Circuit and Wireless Power and Data Transmission"; U.S. Pat. No. 7,812,416 Titled "Methods and Apparatus Having an Integrated Circuit Attached to Fused Silica"; U.S. Pat. No. 8,360,984 Titled "Hypertension System and Method"; U.S. Pat. No. 7,966,886 Titled "Method and Apparatus for Measuring Pressure Inside a Fluid System"; U.S. Pat. No. 7,748,277 Titled "Hermetic Chamber with Electrical Feedthroughs"; U.S. Pat. No. 9,078,563 Titled "Method of Manufacturing Implantable Wireless Sensor for In-Vivo Pressure Measurement"; U.S. Pat. No. 7,621,036 Titled "Method of Manufacturing Implantable Wireless Sensor for In-Vivo Pressure Measurement"; U.S. Pat. No. 8,669,770 Titled "Selectively Actuating Wireless, Passive Implantable Sensor"; U.S. Pat. No. 7,909,770 Titled "Method for Using a Wireless Pressure Sensor to Monitor Pressure Inside the Human Heart"; U.S. Pat. No. 8,353,841 Titled "Apparatus and Method for Sensor Deployment and Fixation"; U.S. Pat. No. 8,118,749 Titled "Apparatus and Method for Sensor Deployment and Fixation"; U.S. Pat. No. 8,355,777 Titled "Apparatus and Method for Sensor Deployment and Fixation"; U.S. Pat. No. 8,021,307 Titled "Apparatus and Method for Sensor Deployment and Fixation U.S. Pat. No. 7,908,018 Titled "Flexible Electrode": U.S. Pat. No. 8,025,625 Titled "Electromagnetically Coupled Hermetic Chamber"; U.S. Pat. No. 9,265,428 Titled "Implantable Wireless Sensor"; U.S. Pat. No. 7,854,172 Titled "Hermetic Chamber with Electrical Feedthroughs"; U.S. Pat. No. 7,839,153 Titled "Communicating With An Implanted Wireless Sensor"; U.S. Pat. No. 9,198,908 Titled "Methods for the Treatment of Cardiovascular Conditions"; U.S. Pat. No. 6,025,725 Titled "Electrically Active Resonant Structures for Wireless Monitoring and Control"; U.S. Pat. No. 7,618,363 Titled "Hydraulically Actuated Artificial Muscle for Ventricular Assist"; U.S. Pat. No. 7,147,604 Titled "High Q Factor Sensor"; U.S. Pat. No. 7,699,059 Titled "Implantable Wireless Sensor"; U.S. Pat. No. 7,481,771 Titled "Implantable Wireless Sensor for Pressure Measurement within the Heart"; U.S. Pat. No. 6,855,115 Titled "Implantable Wireless Sensory for Pressure Measurement within the Heart"; U.S. Pat. No. 7,245,117 Titled "Communicating with Implanted Wireless Sensor"; U.S. Pat. No. 7,574,792 Titled "Method of Manufacturing an Implantable Wireless Sensor"; U.S. Pat. No. 7,662,653 Titled "Method of Manufacturing a Hermetic Chamber with Electrical Feedthroughs"; U.S. Pat. No. 7,498,799 Titled "Communicating with Implanted Wireless Sensor"; U.S. Pat. No. 7,432,723 Titled "Coupling Loop"; U.S. Pat. No. 7,492,144 Titled "Preventing False Locks in a System that Communicated with an Implanted Wireless Sensor"; U.S. Pat. No. 7,466,120 Titled "Communicating with an Implanted Wireless Sensor"; U.S. Pat. No. 7,550,978 Titled "Communicating with an implanted wireless sensor"; U.S. Pat. No. 7,595,647 Titled "Cable Assembly for a Coupling Loop"; U.S. Pat. No. 7,439,723 Titled "Communicating with an Implanted Wireless Sensor"; U.S. Pat. No. 7,647,836 Titled "Hermetic Chamber with Electrical Feedthroughs"; U.S. Pat. No. 7,667,547 Titled "Loosely-Coupled Oscillator"; U.S. Pat. No. 8,111,150 Titled "Physiological Data Acquisition and Management System for use with an Implanted Wireless Sensor"; U.S. Pat. No. 7,710,103 Titled "Preventing False Locks in a System that Communicates with an Implanted Wireless Sensor"; U.S. Pat. No. 7,679,355 Titled "Communicating with an Implanted Wireless Sensor"; U.S. Pat. No. 8,159,348 Titled "Communication System with an Antenna Box Amplifier"; U.S. Pat. No. 7,932,732 Titled "Preventing a False Lock in a Phase Lock Loop"; U.S. Pat. No. 6,159,156 Titled "Pressure Sensor for Use in an Artery"; U.S. Pat. No. 6,743,180 Titled "Pressure Sensor for Use in an Artery"; U.S. Pat. No. 7,936,174 Titled "Coupling Loop"; U.S. Pat. No. 7,973,540 Titled "Coupling Loop and Method of Positioning Coupling Loop"; U.S. Pat. No. 8,237,451 Titled "Communicating with an Implanted Wireless Sensor"; U.S. Pat. No. 7,111,520 Titled "System and Method for the Wireless Sensing of Physical Properties"; U.S. Pat. No. 6,278,379 Titled "System, Method, and Sensors for Sensing Physical Properties"; U.S. Pat. No. 8,665,086 Titled "Physiological Data Acquisition and Management System for Use with an Implanted Wireless Sensor"; U.S. Pat. No. 9,333,351 "Neurostimulation Method And System To Treat Apnea" and U.S. Pat. No. 9,044,610 "System And Methods For Providing A Distributed Virtual Stimulation Cathode For Use With An Implantable Neurostimulation System", which are hereby incorporated by reference. Additionally or alternatively, the IMD may include one or more structural and/or functional aspects of the device(s) described in U.S. Pat. No. 9,216,285 "Leadless Implantable Medical Device Having Removable And Fixed Components" and U.S. Pat. No. 8,831,747 "Leadless Neurostimulation Device And Method Including The Same", which are hereby incorporated by reference. Additionally or alternatively, the IMD may include one or more structural and/or functional aspects of the device(s) described in U.S. Pat. No. 8,391,980 "Method And System For Identifying A Potential Lead Failure In An Implantable Medical Device" and U.S. Pat. No. 9,232,485 "System And Method For Selectively Communicating With An Implantable Medical Device", all of which are incorporated by reference in their entireties.

Patient Monitoring Device

Figure 5:
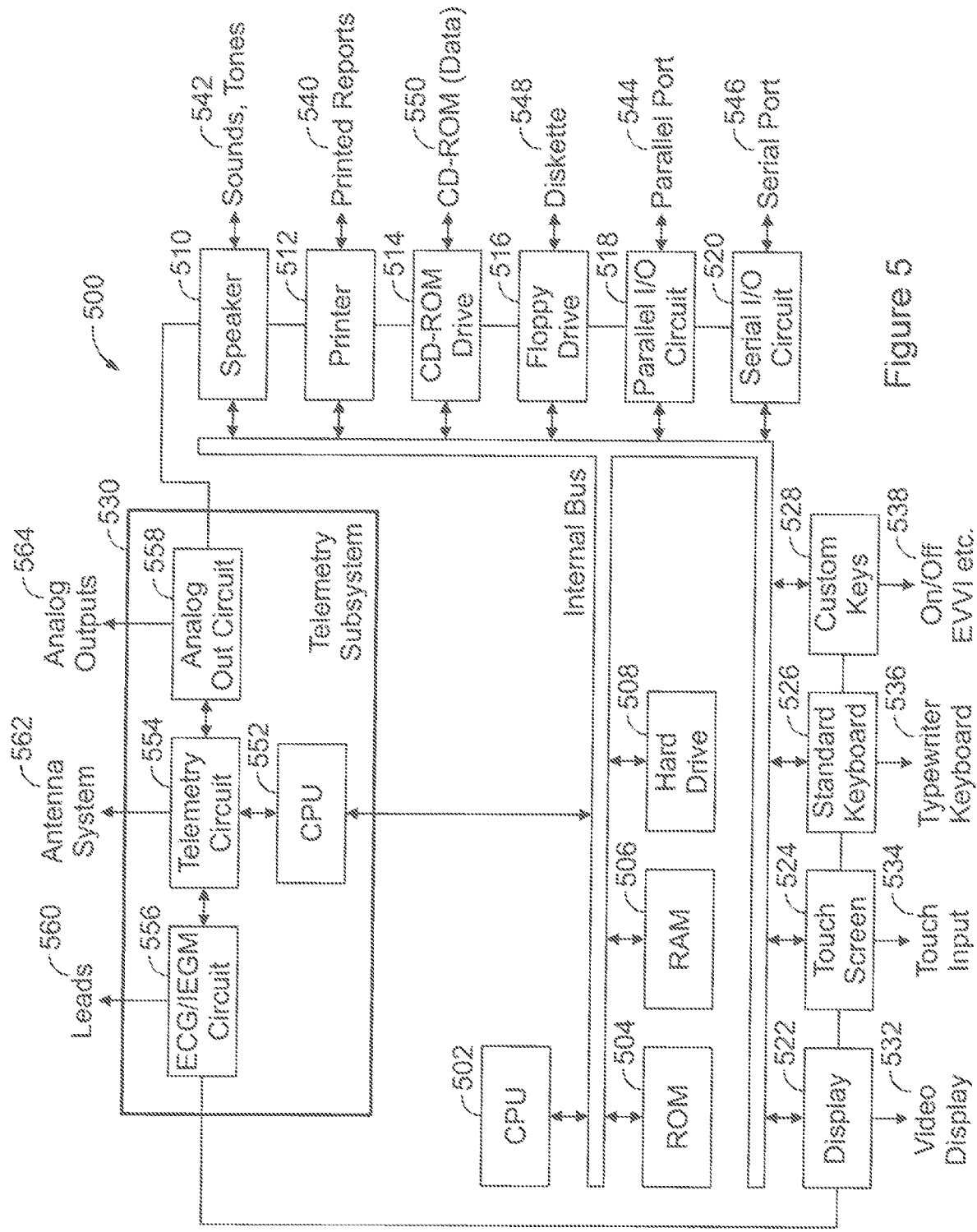
FIG. 5 illustrates a functional block diagram of the patient monitoring device in accordance with embodiments herein.

FIG. 5 illustrates a functional block diagram of a patient monitoring device 500 that is operated in accordance with the processes described herein and to interface with implantable medical devices as described herein. The patient monitoring device 500 may be a workstation, a portable computer, an IMD programmer, a PDA, a cell phone and the like. The patient monitoring device 500 includes an internal bus that connects/interfaces with a Central Processing Unit (CPU) 502, ROM 504, RAM 506, a hard drive 508, the speaker 510, a printer 512, a CD-ROM drive 514, a floppy drive 516, a parallel I/O circuit 518, a serial I/O circuit 520, the display 522, a touch screen 524, a standard keyboard connection 526, custom keys 528, and a telemetry subsystem 530. The internal bus is an address/data bus that transfers information between the various components described herein. The hard drive 508 may store operational programs as well as data, such as waveform templates and detection thresholds.

The CPU 502 typically includes a microprocessor, a micro-controller, or equivalent control circuitry, designed specifically to control interfacing with the patient monitoring device 500 and with the IMD 650. The CPU 502 performs the COI measurement process discussed above. The CPU 502 may include RAM or ROM memory, logic and timing circuitry, state machine circuitry, and I/O circuitry to interface with the IMD 650. The display 522 (e.g., may be connected to the video display 532). The touch screen 524 may display graphic information relating to the IMD 650. The display 522 displays various information related to the processes described herein. The touch screen 524 accepts a user's touch input 534 when selections are made. The keyboard 526 (e.g., a typewriter keyboard 536) allows the user to enter data to the displayed fields, as well as Interface with the telemetry subsystem 530. Furthermore, custom keys 528 turn on/off 538 (e.g., EVVI) the patient monitoring device 500. The printer 512 prints copies of reports 540 for a clinician to review or to be placed in a patient file, and speaker 510 provides an audible warning (e.g., sounds and tones 542) to the user. The parallel I/O circuit 518 interfaces with a parallel port 544. The serial I/O circuit 520 interfaces with a serial port 546. The floppy drive 516 accepts diskettes 548. Optionally, the floppy drive 516 may include a USB port or other interface capable of communicating with a USB device such as a memory stick. The CD-ROM drive 514 accepts CD ROMs 550.

The telemetry subsystem 530 includes a central processing unit (CPU) 552 in electrical communication with a telemetry circuit 554, which communicates with both an IEGM circuit 556 and an analog out circuit 558. Optionally, the circuit 556 may be connected to external or implanted leads 560 to receive and process ECG or IEGM cardiac signals. Optionally, the IEGM cardiac signals may be collected by the IMD and then transmitted, to the patient monitoring device 500, wirelessly through the telemetry subsystem 530. The telemetry circuit 554 is connected to an antenna assembly 562, such as antenna assembly 110, 410. The telemetry circuit 554 communicates with the Implanted medical device in accordance with an active or passive RF communications protocol. The CPU 502 and/or telemetry circuit 554 determines the signal strength of RF signals received from the antenna assembly 562. The signal strength is then displayed on the display 522 to allow the clinician to adjust the position of the antenna to improve/increase the signal strength.

The analog out circuit 558 includes communication circuits to communicate with analog outputs 564. The patient monitoring device 500 may wirelessly communicate with the IMD and utilize protocols, such as Bluetooth, GSM, infrared wireless LANs, HIPERLAN, 3G, satellite, as well as circuit and packet data protocols, and the like. Alternatively, a hard-wired connection may be used to connect the patient monitoring device 500 to the IMD.

Distributed Processing System

Figure 6:
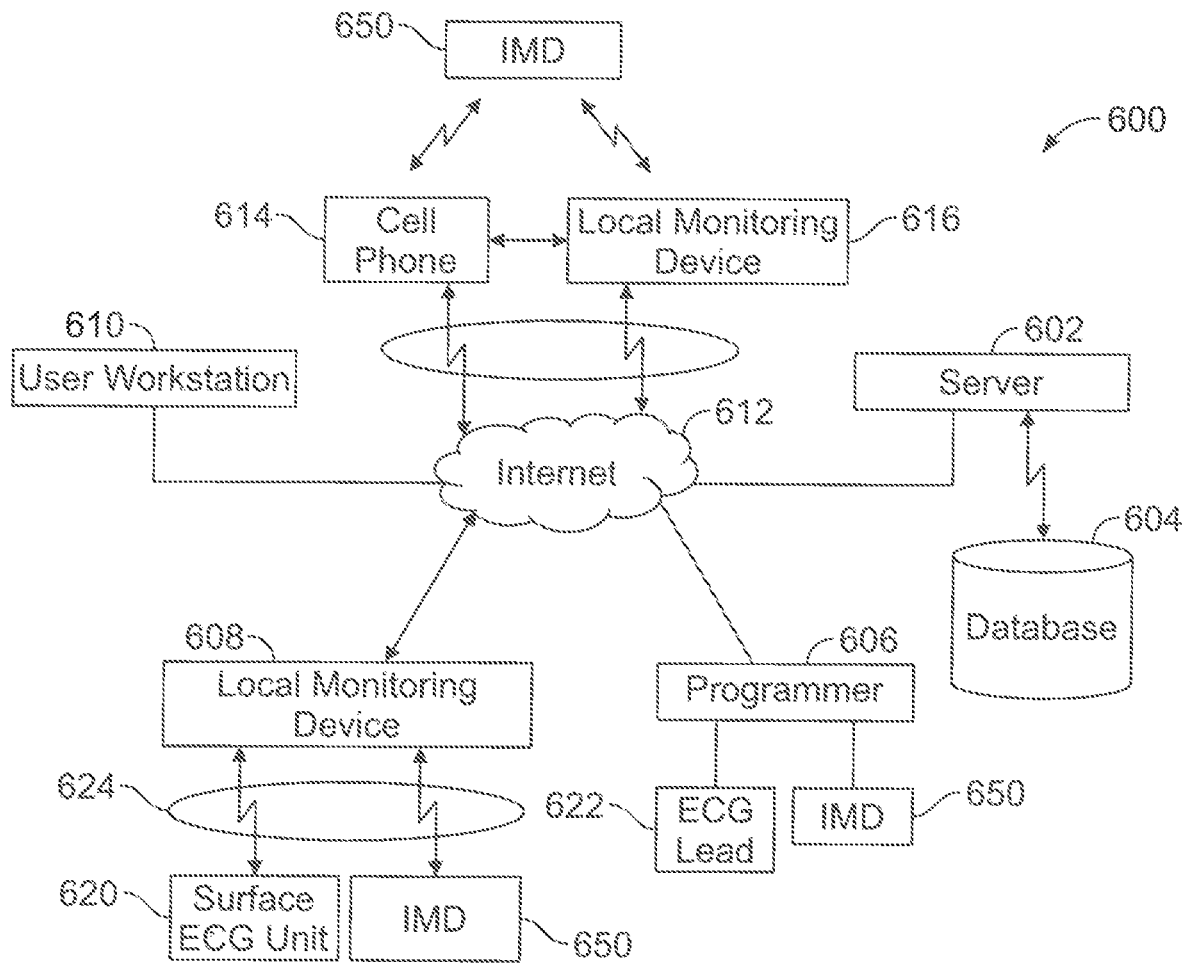
FIG. 6 illustrates a distributed processing system in accordance with embodiments herein.

FIG. 6 illustrates a distributed processing system 600 in accordance with one embodiment. The distributed processing system 600 includes a server 602 connected to a database 604, a patient monitoring device 606, a local RF transceiver 608 and a user workstation 610 electrically connected to a communication system 612. In accordance with embodiments herein, RF signals from the IMD (e.g., pressure measurements, cardiac signals, etc.) may be conveyed from the patient monitoring device 606 to the server 602 for storage and/or to one or more nurses stations (e.g., workstations 610).

The communication system 612 may be the internet, a voice over IP (VoIP) gateway, a local plain old telephone service (POTS) such as a public switched telephone network (PSTN), a cellular phone based network, and the like. Alternatively, the communication system 612 may be a local area network (LAN), a campus area network (CAN), a metropolitan area network (MAN), or a wide area network (WAM). The communication system 612 serves to provide a network that facilitates the transfer/receipt of information such as cardiac signal waveforms, ventricular and atrial heart rates.

The server 602 is a computer system that provides services to other computing systems over a computer network. The server 602 controls the communication of information such as cardiac signal waveforms, ventricular and atrial heart rates, and detection thresholds. The server 602 interfaces with the communication system 612 to transfer information between the patient monitoring device 606, the local antenna systems, the user workstation 610 as well as a cell phone 614 and a personal data assistant (PDA) 616 to the database 604 for storage/retrieval of records of information.

The database 604 stores information such as pressure measurements, cardiac signal waveforms, ventricular and atrial heart rates, thresholds, and the like, for a single or multiple patients. The information is downloaded into the database 604 via the server 602 or, alternatively, the Information is uploaded to the server from the database 604. The patient monitoring device 606 and may reside in a patient's home, a hospital, or a clinician's office. The patient monitoring device 606 interfaces with the IMD 650. The patient monitoring device 606 may wirelessly communicate with the IMD 650 and utilize protocols, such as Bluetooth, GSM, infrared wireless LANs, HIPERLAN, 3G, satellite, as well as circuit and packet data protocols, and the like. Alternatively, a hard-wired connection may be used to connect the patient monitoring device 606 to the IMD 650. The patient monitoring device 606 is able to acquire cardiac signals from the surface of a person (e.g., ECGs), intra-cardiac electrogram (e.g., IEGM) signals from the IMD 650, and/or cardiac signal waveforms, ventricular and atrial heart rates, and detection thresholds from the IMD 650. The patient monitoring device 606 interfaces with the communication system 612, either via the internet or via POTS, to upload the information acquired from the surface ECG unit 620, the lead 622 or the IMD 650 to the server 602.

The local RF transceiver 608 interfaces with the communication system 612 to upload one or more of pressure measurements, and cardiac signal waveforms to the server 602. The user workstation 610 may interface with the communication system 612 via the Internet or POTS to download cardiac signal waveforms, ventricular and atrial heart rates, and detection thresholds via the server 602 from the database 604. Alternatively, the user workstation 610 may download raw data from the surface ECG units 620, lead 622 or IMD 650 via either the patient monitoring device 606 or the local RF transceiver 608. Once the user workstation 610 has downloaded the cardiac signal waveforms, ventricular and atrial heart rates, or detection thresholds, the user workstation 610 may process the information in accordance with one or more of the operations described above. The user workstation 610 may download the information and notifications to the cell phone 614, the PDA 616, the local RF transceiver 608, the patient monitoring device 606, or to the server 602 to be stored on the database 604. For example, the user workstation 610 may communicate data to the cell phone 614 or PDA 616 via a wireless communication link 624.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An antenna system for communicating with a medical device implanted in a patient, the system comprising:
    upper and lower shells that join to form an antenna tunnel there between, at least one of the upper or lower shells including an opening along an edge thereof to form a passage to the antenna tunnel, wherein the upper shell includes an outer patient engaging surface configured to receive a weight of the patient;
    an antenna assembly that includes a substrate and an inductive RF antenna provided on the substrate, the substrate including a stem projecting through the passage;
    a handle joined to the stem, the handle located outside of the antenna tunnel, wherein the antenna assembly is movable within the antenna tunnel in response to adjustment of the handle relative to the upper and lower shells; and
    an electronics circuit electrically coupled to the antenna, the electronics circuit configured to transmit and receive inductive RF signals to and from the medical device implanted in the patient.

2. The antenna system of claim 1, wherein the upper and lower shells maintain a predetermined height within the antenna tunnel while experiencing a load on the upper shell.

3. The antenna system of claim 1, wherein the upper and lower shells maintain the predetermined height to resist formation of a binding engagement between the antenna assembly and the antenna tunnel while supporting, as the load, a weight of a patient arranged in a supine position resting on the outer patient engaging surface.

4. The antenna system of claim 1, wherein the upper shell is formed with a concave body that includes a patient comfort taper in the outer patient engaging surface in at least one of longitudinal and lateral directions.

5. The antenna system of claim 1, wherein the upper shell includes an inner surface having reinforcement ribs thereon to resist bowing while experiencing a load on the outer patient engaging surface, and wherein the lower shell includes an inner surface configured to maintain a low friction interface with the substrate of the antenna assembly when the antenna assembly is moved relative to the lower shell.

6. The antenna system of claim 1, wherein the upper and lower shells are formed as planar plates and are spaced apart from one another by peripheral supports to define the antenna tunnel.

7. The antenna system of claim 1, wherein the antenna comprises inner and outer traces provided on the substrate, the inner and outer traces arranged concentric with one another and extending in a generally circular direction about a common center point.

8. The antenna system of claim 1, wherein the electronics circuit is housed within the handle, the electronics circuit including a transmitter configured to wirelessly communicate with a monitoring device.

9. The antenna system of claim 1, wherein the antenna assembly is configured to be moved within the antenna tunnel in connection with aligning the antenna with the medical device.

10. The antenna system of claim 1, wherein the lower shell includes an outer mounting surface configured to be positioned on a patient table, wherein the upper shell includes an outer patient engaging surface configured to abut against a patient torso.

11. The antenna system of claim 1, wherein the inductive RF antenna is configured to transmit and receive RF signals in a range of 1 to 100 MHz.

12. The antenna system of claim 1, wherein the inductive RF antenna includes an RF transmitting coil and an RF receiving coil that are arranged concentric with one another.

13. A method comprising:
providing an antenna system comprising upper and lower shells that join to form an antenna tunnel there between, and an antenna assembly that includes a substrate and an inductive RF antenna provided on the substrate, the antenna assembly including a handle located outside of the upper and lower shells;
positioning a patient, having an implantable medical device, against the outer shell such that the implantable medical device is located proximate to the antenna system; and
aligning the inductive RF antenna with the implantable medical device by adjusting a position of the handle to move the antenna assembly within the antenna tunnel.

14. The method of claim 13, further comprising adjusting the position of the antenna assembly within the antenna tunnel to adjust a signal strength of inductive RF signals received by the RF antenna from the medical device until achieving a predetermined signal strength.

15. The method of claim 14, further comprising determining the signal strength of inductive RF signals received by the RF antenna from the medical device, and displaying an indication of the signal strength on a display of a monitoring device, the adjusting the position of the antenna assembly based on the indication of the signal strength displayed.

16. The method of claim 13, wherein the adjusting the position of the antenna assembly includes sliding the antenna assembly within the antenna tunnel without changing a position of the patient against the outer shell.

17. The method of claim 13, further comprising transmitting and receiving inductive RF signals in a frequency range of 1-100 MHz between the inductive RF antenna and the medical device.

* * * * *